United States Patent Office 3,088,135
Patented May 7, 1963

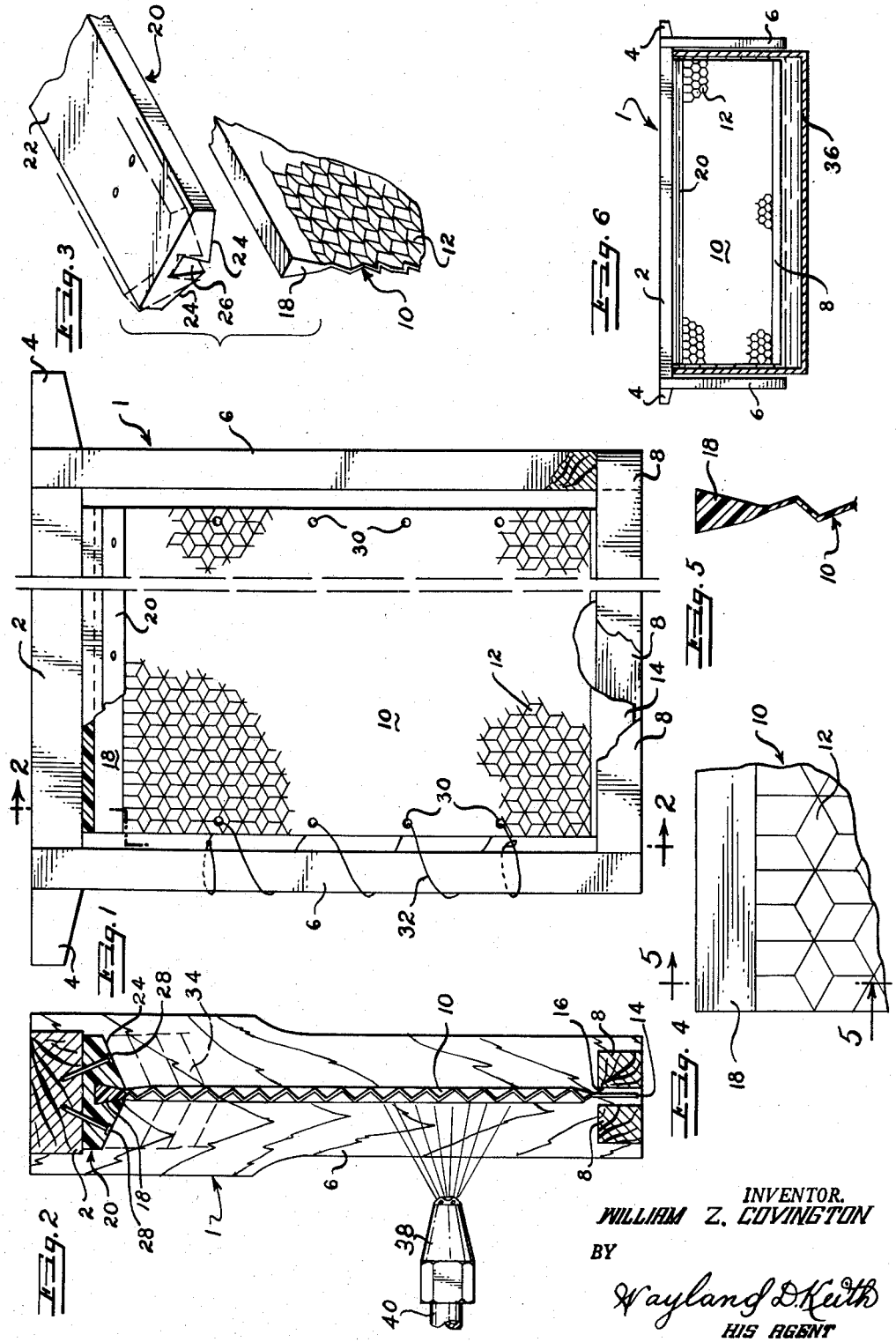

3,088,135
FRAME AND PLASTIC COMB FOUNDATION
FOR BEEHIVES
William Z. Covington, 1712 E. Fort Worth St.,
Wichita Falls, Tex.
Filed Aug. 10, 1961, Ser. No. 130,569
3 Claims. (Cl. 6—10)

This invention relates to permanent comb foundations for use in beehives, and more particularly to a plastic, beeswax coated, permanent comb foundation which may be placed in a removable frame in a beehive, thereby saving considerable time on the part of the worker bees in making comb foundation and the comb thereon, which comb is subsequently filled with honey.

In producing honey on a commercial basis, it is desirable to produce as much honey as possible in a season, therefore, any provision to increase the amount of honey produced by the bees and to decrease the time required to produce comb is helpful to the producer.

Various foundations for comb, both of the wax type and of the metal type, have been proposed heretofore, but, for the most part, these offered certain disadvantages which the present invention proposes to overcome.

The present sheet plastic, wax coated, permanent comb foundation is so constructed that it is readily attachable to frames of a wide variety, which comb foundations may either be wired in place in the frame or placed therein without wiring, but which will serve the purpose of a foundation for comb which may be used season after season, as such comb foundations with the wax coating on the foundation may be removed, cleaned, sterilized and rewaxed and then reinserted into the beehive without removing the comb foundation from the frame, and on which foundation the bees build up comb cells to be filled with honey or the serve as brood cells, as the case may be.

Comb foundations of wax have long been used, but these had to be cut from the frames and destroyed when they became old and/or contaminated, and replaced with new comb foundations. The work was time consuming and frequent replacement was expensive.

The present invention provides a comb foundation which may be used for years by the simple expedient of cleaning and rewaxing it as conditions require, thereby saving expense and man hours, and at the same time providing a comb foundation acceptable to the bees.

The use of some plastic honeycomb foundations have been rejected by the bees, but after much experimentation, the applicant has found that, if bees are to accept and use the plastic honeycomb foundations, they must be coated on each side with a material acceptable to the bees, preferably beeswax, on which to join the cells of the honyecomb which they are to build and fill.

By having the permanent, plastic comb foundation within the frames, the frames containing the honey filled comb may be readily removed and placed in an extractor, thereby the liquid honey is extracted from the comb, without material damage to the comb foundation, and the frames, containing the empty honeycomb may be replaced within the hive to enable the bees to exert their entire efforts to refilling the comb with honey, as they do not have to replace the comb, which is to be filled with honey, after the extraction of the honey from the comb by the extractor, which extractor is usually of the centrifuge type.

While reference has been made to plastic as being the basis of the material for constructing the comb foundation, it is to be understood this is to include such materials as polyethelene plastics, acrylic plastics, or other resinous and synthetic resin plastics or other permanent, non-metallic, formative material which is acceptable to bees for building comb thereon, either with or without being coated with a wax or other material acceptable to the bees.

The present foundation provides the rigidity of plastic and the low heat conductivity thereof, thereby minimizing the danger of the comb cells being melted from the foundation, as would be possible if comb foundations of metal were used. The rigid plastic comb foundation withstands rough and rugged usage more readily than would foundations formed entirely of natural beeswax. Furthermore, the plastic sheet comb foundation containing old comb may be dipped into a container of heated water to melt the comb therefrom, the beeswax from which comb may be salvaged and used to rewax the foundation, or excess beeswax may be salvaged for reuse or to be sold.

The present permanent plastic foundation may be connected to the frame or detached therefrom, as desired, by the use of ordinary tools, and furthermore, the attachment strip for attaching the foundation to the frame may be readily separated from the plastic comb foundation or re-attached thereto merely by flexing the attachment strip. The present comb foundation, with the attachment strip therefor, is so constructed as to induce the bees to build honeycomb cells which will slope outwardly and upwardly from the plastic sheet foundation, which will result in a more useful cell structure, than if the lower faces of the attachment strip were not angularly disposed upwardly and outwardly from the medial portion thereof.

An object of this invention is to provide a permanent comb foundation for attachment to a frame for use in a beehive, which frame, when filled with honeycomb containing honey, may be removed from the hive for extraction of the honey, and the foundation with the comb thereon may be returned to the hive for reuse by the bees, thereby relieving the bees of the labor of building comb foundation and comb cells for honey each time honey is extracted from the frame.

Another object of this invention is to provide a permanent, wax coated, plastic honeycomb foundation which may be readily attached to or detached from the frame as desired.

A further object of the invention is to provide a permanent, wax coated, plastic foundation for honeycomb, which is low in heat conductivity, which is readily acceptable to the bees, and which does not necessitate the use of auxiliary wax sheets on each side of the foundation.

Still another object of the invention is to provide a wax-coated, permanent foundation for honeycomb which is readily attachable to or detachable from an attachment strip, which attachment strip may be readily attached to standard type frames as used in beehives.

Yet another object of the invention is to provide an attachment strip for the comb foundation which is angularly inclined downwardly and inwardly, so as to induce the bees to form honeycomb cells which converge inwardly and downwardly toward the comb foundation.

With these objects in mind and others which will become manifest as the description proceeds, reference is to be had to the accompanying drawings, in which like reference characters designate like parts in the several views thereof, in which:

FIG. 1 is an elevational view of a honeycomb frame for placement into the super of a beehive, with parts being broken away, other parts being shortened, and with parts being shown in section to bring out the details of construction, and showing a plastic sheet comb foundation attached therein;

FIG. 2 is a sectional view taken on the line 2—2 of

FIG. 1, looking in the direction indicated by the arrows;

FIG. 3 is a fragmentary, exploded perspective view of a wax-coated, permanent, plastic comb foundation member, showing a wax coated attachment strip therefor, the attachment strip being shown in normal position in full outline, and in a distorted position in dashed outline, in order to illustrate the manner of attaching and removing the plastic comb foundation therefrom;

FIG. 4 is an enlarged, fragmentary, elevational view of a portion of the wax-coated, permanent comb foundation 10 apart from the attachment strip;

FIG. 5 is a sectional view taken on the line 5—5 of FIG. 4, looking in the direction indicated by the arrows; and FIG. 6 is an elevational view of a honeycomb frame, on a reduced scale, with the bottom strip portion thereof removed, and showing the plastic honeycomb foundation mounted therein, and showing a water containing vessel in cross section, to illustrate one method of removing wax from the permanent comb foundation, and a method of coating each side of the permanent, plastic comb foundation with wax simultaneously.

With more detailed reference to the drawing, the numeral 1 designates generally a honeycomb foundation frame, such as used in beehives, both in the brood portion of the hive and in the honey producing work portion of the hive, which frames are arranged in side-by-side relation in a manner well known in the art of bee culture. These frames are usually constructed with a top bar portion 2 having outwardly extending end portions 4, which portions 4 are adapted to rest on supports within the beehive to support the frames 1 in a substantially upright position, as shown in FIGS. 1 and 2. The frame 1 has end members 6 secured to bar 2, which members extend downwardly and have a pair of spaced apart or divided bars 8, the end members 6 being notched on the lower end thereof to receive the bar 8.

The permanent plastic comb foundation is indicated by the numeral 10, and has hexagonal, cellular recesses 12 formed over the major portion of the plane surface, on each side thereof, to simulate the middle portion of honeycomb on which the honeycomb cells are built. The lower edge of the permanent, plastic comb foundation is plane, as indicated at 14, so as to extend into the slot 16 which is formed between the bars of divided bottom bar 8. The upper edge of the permanent, plastic comb foundation member 10 diverges outwardly to form a substantially triangular cross section, as indicated at 18, as will best be seen in FIGS. 3 and 5. A plastic attachment strip 20 is formed with a flat upper face 22 and with an angulated lower face 24, which faces converge inwardly and downwardly with a longitudinal groove 26 formed in the lower portion thereof, which groove is complementary to the triangular upper edge 18 of the comb foundation member 10.

The attachment strip 20 is made of yieldable plastic and may be readily distorted from the form as shown in full outline in FIGS. 2 and 3, to the dashed outline position, as shown in FIG. 3, whereby the groove 26 of the strip may be engaged with the triangular upper edge 18 of comb foundation 10, so that the comb foundation member 10 may be held securely in place within the groove 26. The attachment strip 20 is readily attached to upper longitudinal bar 2 in any suitable manner, as by nails 28, with the comb foundation extending downward, as indicated in FIGS. 1 and 2. The comb foundation 10 is normally formed with holes 30 therein, which are formed at spaced intervals along the edges thereof, so, if desired, a wire 32 may be passed therethrough and around the end members 6 to hold the plastic comb foundation against lateral movement, when the frame with the comb foundation therein, on which comb foundation the honeycomb cells have been formed and filled with honey, is placed within a centrifugal extractor for the extraction of the honey from the honeycomb.

The attachment strip 20 has the lower faces 24 thereof at an angle, which angles converge inwardly toward the comb foundation member 10, so upon coating the comb foundation member 10 and the attachment strip 20 with wax, such as beeswax, which is the material most acceptable to the bees of any material presently known, the wax coating may be deposited on each face side of the comb foundation member and to the faces of the attachment strip. The angular portion of the attachment strip is so built that the bees to build the upper courses of comb cells 34 at an angle corresponding to the angle of the faces 24 of the attachment strip. It is the natural, normal practice of the bees to build the upper courses of the cells at an angle, and it has been found that to provide comb foundations on which the bees can work naturally, results in the bees being more contented, because this provides normal working conditions, since it has been noted that the bees make the top courses of cells at an angle, even though a flat surface is provided. The present device is so shaped as to comply with the natural working habits of the bees.

The angle of the faces 24 of strip 20 is in accordance with the accepted practice of the bees building cells, and gives greater strength to the comb 34, which apparently is of value in keeping the bees contented, and it is theorized that contented bees produce honey in greater abundance when contented and working under natural conditions.

It is also to be pointed out that the attachment strip 20 and the permanent plastic comb foundation 10 may be readily coated with beeswax or other suitable wax, by removing the bottom strips 8 and dipping the comb foundation 10 into a vessel 36, which has been prepared by being filled with hot water and wax, then by dipping the frame, with the comb foundation therein, into the vessel and withdrawing it therefrom, a film of beeswax will adhere to the surface of the attachment strip and to the surfaces of the plastic comb foundation 10, in such manner that bees, apparently cannot discern any difference between the wax coated, permanent, plastic comb foundation and the genuine beeswax comb foundation, as it would be built by the bees, had the plastic comb foundation not been provided. With the comb foundation provided, the bees can immediately start building honeycomb cells, as indicated at 34, onto the comb foundation 10, in a manner well understood in the art of bee culture.

While reference has been made to plastic as forming the basis of the material for constructing the comb foundation, it is to be understood that this includes such material as polyethelene plastics, arcrylic plastics, and other resinous or synthetic plastics, and other permanent, non-metallic foundation material which is acceptable to bees for building comb cells thereon, either with or without being coated with a wax or other material acceptable to the bees.

Another method of coating the plastic comb foundation on each side is by supplying the hot wax onto the surface of the comb foundation and onto the attachment strip 20, such coating material may be applied by means of a spray nozzle 38 attached to a conduit 40 which leads to a suitable source of liquid wax under pressure. The conduit may also carry air therein to properly atomize the liquid wax.

Furthermore, by having the plastic comb foundation in brood frames, in the brood compartment of the beehive, the bees will build cells thereonto out of beeswax to form brood cells for the raising of young bees, which cells, when used several seasons for raising bees therein, often become hardened and discolored, with the cells deteriorating and possibly contributing to "foul-brood" disease, fungi, and other contamination. The present plastic comb foundation will enable brood frames to be removed when the comb becomes old and contaminated, and the comb removed therefrom, as by immersing in hot water, and the plastic comb foundation sterilized and recoated with clean beeswax, and the brood frames reinserted into the brood compartment or the hive body of the beehive to enable the bees to maintain a high standard of cleanliness in the beehive, thereby a more healthful environment for the bees. The present plastic comb foundation may be used season after season, and when aging of the brood comb in the frames so indicate, the process of repeating the aforementioned cleaning and recoating process may be carried out, and the use of the plastic comb foundation repeated.

Having thus clearly shown and described the invention, what is claimed as new and desired to be secured by Letters Patent is:

1. A honeycomb foundation to be used within a beehive which honeycomb foundation comprises an elongated sheet of plastic material, which sheet of plastic material has hexagonal indentures complementally arranged on opposite sides thereof, the upper portion of said plastic sheet being thickened to form a wedge-shaped edge, with the wider portion of said wedge-shaped edge being the upper exterior edge of said sheet, said plastic sheet being of a size to cover a predetermined area in the beehive which the honeycomb is to occupy, an elongated strip of yieldable material having a wedge-shaped groove formed therein, which groove is complementary to said wedge-shaped portion of said plasitc sheet and being engageable therewith, a frame of a size complementary to said plastic sheet, means securing said elongated strip of yieldable material to a side of said frame, means attachably securing said plastic sheet with said strip of elongated material in said frame, and means forming a coating over opposite faces of said plastic sheet, which coating material is conducive to bees building honeycomb cells thereupon.

2. In combination a foundation for honeycomb for use within a beehive, a rectangular frame, an elongated strip within the inner upper portion of said frame, which strip has a longitudinal, dovetailed groove extending medially thereof, a rectangular plastic sheet having a wedge-shaped edge thereon, which wedge-shaped edge is complementary to and received by said dovetailed groove in said strip, said plastic sheet having hexagonal recesses formed in side-by-side relation over each face thereof, with the recesses on one face being in off-set relation to the recesses on the opposite face so the wall of said recesses on one side will be coextensive with the walls of the recesses on the opposite side, the opposite side of said frame having a slot formed therethrough, said rectangular plastic sheet having plane marginal surfaces on the opposite sides thereof from said wedge-shaped edge with said plane marginal surfaces extending into said slot within said frame, and means coating the faces of said plastic sheet with a substance conducive to the bees to join honeycomb to said coating material on said sheet.

3. A honeycomb foundation to be used in a beehive, which honeycomb foundation comprises an elongated sheet of plastic material which has hexagonal indentures complementally arranged on opposite sides thereof, the upper portion of said plastic sheet being thickened to form a wedge-shaped edge, with the wider portion of said wedge-shaped edge being the upper edge of said sheets, a comb support frame, a unitary strip having an elongated complementary groove formed therein secured to the upper inner side of said frame to receive said wedge-shaped edge of said plastic sheet, said plastic sheet being of a size to cover a predetermined area in the beehive which the honeycomb is to occupy, the opposite edge of said elongated sheet of plastic material having plane marginal surfaces on opposite sides for a spaced distance upward from the edge thereof, said wedge-shaped upper edge and said plane marginal surfaces on opposite edge of said elongated sheet being adapted to fit within said frame to define a surface upon which honeycomb is to be built, said honeycomb foundation sheet having the hexagonal indentures therein being of substantially uniform thickness between the upper wedge-shaped edge and the lower plane marginal surfaces, means securing said sheet of plastic material against lateral movement within said frame, and means forming a coating, over opposite faces of said plastic sheet, of material which is conducive to bees building honeycomb cells thereupon.

References Cited in the file of this patent

UNITED STATES PATENTS

| | | |
|---|---|---|
| 481,578 | Mason | Aug. 30, 1892 |
| 994,559 | Aspinwall | June 9, 1911 |
| 2,561,147 | Smith | July 17, 1951 |

FOREIGN PATENTS

| | | |
|---|---|---|
| 7,511 | Great Britain | 1893 |
| 9,563 | Great Britain | 1901 |
| 2,870 | Great Britain | 1911 |
| 616,718 | Great Britain | Jan. 26, 1949 |
| 145,502 | Australia | Feb. 29, 1952 |